US009422676B2

(12) United States Patent
Huhn

(10) Patent No.: US 9,422,676 B2
(45) Date of Patent: Aug. 23, 2016

(54) FLUID DELIVERY DEVICE, INJECTION DEVICE, GROUND MILLING MACHINE, AND METHOD

(71) Applicant: BOMAG GmbH, Boppard (DE)

(72) Inventor: Alexander Huhn, Reidenhausen (DE)

(73) Assignee: BOMAG GmbH, Boppard (DE)

( * ) Notice: Subject to any disclaimer, the term of this patent is extended or adjusted under 35 U.S.C. 154(b) by 0 days.

(21) Appl. No.: 14/919,155

(22) Filed: Oct. 21, 2015

(65) Prior Publication Data

US 2016/0108586 A1 Apr. 21, 2016

(30) Foreign Application Priority Data

Oct. 21, 2014 (DE) ........................ 10 2014 015 589

(51) Int. Cl.

| | |
|---|---|
| ***E01C 23/00*** | (2006.01) |
| ***E01C 23/06*** | (2006.01) |
| ***F16K 1/12*** | (2006.01) |
| ***F16K 31/122*** | (2006.01) |
| ***E01C 23/088*** | (2006.01) |
| ***E01C 23/12*** | (2006.01) |

(52) U.S. Cl.

CPC ........... *E01C 23/065* (2013.01); *E01C 23/088* (2013.01); *E01C 23/127* (2013.01); *F16K 1/12* (2013.01); *F16K 31/122* (2013.01)

(58) Field of Classification Search

CPC .. E01C 23/065; E01C 23/088; E01C 23/127; F16K 1/12; F16K 31/122

USPC ..................................... 404/90, 92, 108, 111

See application file for complete search history.

(56) References Cited

U.S. PATENT DOCUMENTS

| | | | | |
|---|---|---|---|---|
| 2,614,885 A * | 10/1952 | Roell | B05B 15/0233 | 137/244 |
| 4,074,858 A * | 2/1978 | Burns | B05B 12/06 | 111/127 |
| 4,192,466 A * | 3/1980 | Tanasawa | F02M 51/0671 | 239/464 |
| 4,283,012 A * | 8/1981 | Hanson | A23G 3/2092 | 118/17 |
| 5,893,677 A * | 4/1999 | Haehn | E01C 23/088 | 299/39.4 |
| 6,565,281 B2 * | 5/2003 | Bruns | B05B 15/0208 | 239/118 |
| 6,887,013 B2 * | 5/2005 | Ley | B05B 1/3046 | 222/149 |
| 2004/0146353 A1 | 7/2004 | Ley et al. | | |
| 2015/0098760 A1 | 4/2015 | Menzenbach et al. | | |

FOREIGN PATENT DOCUMENTS

| | | |
|---|---|---|
| DE | 102 41 067 B3 | 4/2004 |
| DE | 10 2013 016 515 A1 | 4/2015 |

* cited by examiner

*Primary Examiner* — Raymond W Addie

(74) *Attorney, Agent, or Firm* — Wood, Herron & Evans, LLP

(57) ABSTRACT

A fluid delivery device for an injection device for introducing a fluid into a work chamber of a ground milling machine, comprising a fluid supply chamber having at least one outlet opening, the outlet opening being closable by a linearly displaceable tappet. The tappet includes an opening region in which it has a smaller cross-sectional area than the minimum cross-sectional area of the outlet opening, and a tappet head for the closure of the outlet opening, the tappet head having a cross-sectional area that includes the cross-sectional area of the outlet opening. Further, the fluid delivery device comprises a displacement device for moving the tappet between a closed position, in which the outlet opening is closed by the tappet, and an open position, in which the outlet opening is open for delivering fluid outward out of the fluid supply chamber. The tappet is configured such that the tappet head closes the outlet opening from the outside in the closed position, and that the opening region is at least partially arranged in the outlet opening and the tappet head at least partially opens the outlet opening in the open position.

17 Claims, 9 Drawing Sheets

343 P 300 340 333 341 330 311 310 O S 320 324 331

100
A
300
103
101
102
U
104
201
101'
202

300
343
335
341
340
311
334
330
310
O
S
331
320
L 300
343
335
341
340
334
311
310
330
O
S
331
320

334
330
320
332
323
322
311
O
S
321
333
331
324

343
P
300
340
333
341
330
311
310
O
S
320
324
331

O1
D334
D322
F
H332
H322
H311
HO
O
S
L
D332
O2
D331
α
D321

D321

D322
D334
D332
L
D331

200
203
340
201
202
310
300

FLUID DELIVERY DEVICE, INJECTION DEVICE, GROUND MILLING MACHINE, AND METHOD

CROSS-REFERENCE TO RELATED APPLICATIONS

The present application claims priority under 35 U.S.C. §119 of German Patent Application No. 10 2014 015 589.7, filed Oct. 21, 2014, the disclosure of which is hereby incorporated herein by reference in its entirety.

FIELD OF THE INVENTION

The present invention relates to a fluid delivery device for an injection device for introducing a fluid into a work chamber of a ground milling machine, an injection device having such a fluid delivery device, a ground milling machine having such an injection device, as well as a method for controlling the opening state of such a fluid delivery device.

BACKGROUND OF THE INVENTION

Generic injection devices are often used in ground milling machines to reduce the development of dust during the work process and/or to add fluid, in particular water, to the ground material to be processed in order to obtain desired properties. Typical ground milling machines that injection devices of this type are used in include, for example, cold milling machines for milling off road or ground surfaces, stabilizers for stabilizing ground of low bearing capacity and recyclers for repairing road pavements in need of repair. Ground milling machines usually comprise as a working device a milling drum with which the ground or the road can be milled and/or be thoroughly mixed. The milling drum is mounted directly or indirectly on a machine frame of the ground milling machine and extends with its rotational axis horizontally and transversely to the working direction of the ground milling machine. The milling drum is further usually mounted in a work chamber which is open towards the ground and in which the milling drum rotates in operation and comes into contact with the ground to be processed. The milling drum is usually shielded off towards the other sides, for example, by a protective hood or a milling drum box. As a result of the closed configuration of the work chamber, it is prevented, among other things, that the material milled off by the milling drum rotating about its longitudinal axis will be ejected in an uncontrollable manner into the ambient environment of the construction machine. The outwardly delimited work chamber is further used for the transport of material in order to enable the controlled removal of material milled off by the milling drum. In another application, the task of the work chamber is to provide a mixing space in which the milled raw material can be mixed with an additive in order to achieve fortification or stabilization of the ground, for example. Typical additives in this regard are hydraulic or bituminous bonding agents and/or water, for example.

In order to enable adding a fluid to the work chamber in working operation, the ground milling machine comprises an injection device. Specifically, the injection device usually comprises at least one fluid delivery device, by means of which the fluid can be introduced into the work chamber. Such a fluid delivery device can be a valve, for example, and comprise an outlet opening or an outlet nozzle opening into the work chamber. Frequently, the part of the fluid delivery device via which the fluid enters the work chamber is arranged in the interior of the work chamber. Hereinafter, the term 'fluid delivery device' shall comprise any means that are provided for direct delivery of the fluid into the work chamber through an outlet opening in a controlled manner. In contrast, an injection device comprises the constructional entirety for introducing a fluid into the work chamber and usually comprises at least two fluid delivery devices and, for example, a line system for supplying fluid to the fluid delivery devices. A generic fluid delivery device comprises inter alia a fluid supply chamber. In this instance, a fluid supply chamber means a space surrounded by walls into which chamber enters the fluid coming from a fluid supply and exits via an outlet opening from the fluid supply chamber into the work chamber. Specifically, the fluid supply chamber may, for example, be an individual chamber, an injection beam, a part of a ring line, etc. It is known to provide the outlet opening with a controllable closure, so that the outlet opening may be opened and closed in a valve-like manner, if required.

A typical application in which the introduction of a fluid into the work chamber of the ground milling machine is desired is the mixing of the material milled by the milling drum in the work chamber with water in order to achieve improved material properties of the ground material together with bonding agents such as lime, for example, which may have been previously applied to the ground to be processed. Alternatively or additionally, a reduction in the development of dust in working operation can be achieved by wetting the ground material. Further exemplary applications are the introduction of bituminous bonding agents, the production and introduction of foamed bitumen, etc.

A generic fluid delivery device for a ground milling machine is already known from DE 102 41 067 B3, comprising a fluid supply chamber with an outlet opening and a controllable closure device for the outlet opening. The closure device comprises an adjustable tappet which opens the outlet opening in a retracted open position and which closes the outlet opening in a closed position. For opening the outlet opening, the linearly adjustable tappet is retracted into the fluid supply chamber, so that the outlet opening is completely open in the open position. In contrast, for closing the outlet opening, the tappet is pushed into the outlet opening until it completely closes the cross-section of the outlet opening. In addition, a stroke movement of the tappet beyond the closed position is provided for cleaning the outlet opening or for removing dirt accumulated in front of the opening. To that end, the tappet can be pushed outward through the outlet opening beyond the closed position, the outlet opening remaining closed by the tappet. A displacement device is provided for displacing the tappet, by means of which the tappet can be displaced between the closed position and the open position. The displacement device is specifically a piston-cylinder unit.

However, in the closure device known from the prior art the outlet opening can only be opened completely or not at all, which is why the injection pattern can only be varied via the pressure in the fluid supply chamber and thus by means of the output amount. In many cases, this results in a non-uniform injection pattern, particularly when using multiple fluid delivery devices in one injection device, even to the point that the fluid drips out of the outlet opening in an uncontrolled manner in the case of low output amounts. Furthermore, the fluid delivery device is very large in the displacement direction of the tappet due to the required long overall stroke and therefore requires a comparatively large installation space.

SUMMARY OF THE INVENTION

It is therefore the object of the present invention to provide a fluid delivery device for a ground milling machine with which, on the one hand, the injection pattern can be better varied, in which a clogging of the outlet opening by ground material can be prevented and which requires a smaller installation space at the same time.

One aspect of the present invention lies with the configuration according to the present invention of a generic fluid delivery device such that the tappet additionally comprises a tappet head and that closing the outlet opening is effected from the outside by the tappet head, i.e., from the fluid outlet side of the fluid supply chamber. The tappet head is a closure element which is located at the end of a tappet shaft of the tappet extending longitudinally in the displacement direction and which, with respect to its cross-sectional area perpendicular to the longitudinal extension of the tappet shaft, is at least partially greater than the region of the tappet shaft that adjoins the tappet head. Hereinafter, the narrower region adjoining the tappet head will be referred to as opening region of the tappet. In this instance, the opening region refers to the region of the tappet shaft that is positioned in the region of the outlet opening when the fluid is delivered and along which the fluid flows through the outlet opening at least partially. The cross-sectional area refers to the area of a sectional plane running perpendicular to the linear displacement axis of the tappet, said area being defined by the outer contour of the respective element. The cross-sectional area of the outlet opening refers to the size of the opening area in said sectional plane. The displacement axis is the axis along which the tappet is moved when moving between its closed position and its open position. The tappet head has a maximum cross-sectional area which is greater than the minimum cross-sectional area of the outlet opening, wherein with respect to the cross-sectional contour of the tappet head, said tappet head is configured in at least one region such that it completely surrounds the outlet opening cross-sectionally on the outside in order to close said opening in the closed position. In the case that the outlet opening has a varying opening diameter, the tappet head is configured such that with respect to its cross-section, said tappet head runs at least around the minimum cross-sectional area of the outlet opening. This ensures that the tappet head is capable of closing the outlet opening.

For opening the outlet opening in order to enable a fluid to be delivered from the interior of the fluid supply chamber toward the outer side through the outlet opening, the tappet head is displaced outward away from the outlet opening so that at least a part of the opening region enters the outlet opening. To that end, the opening region comprises at least partially a cross-sectional area that is smaller than the minimum cross-section of the outlet opening. If the tappet shaft is partially located with its opening region in the outlet opening, said opening is thus no longer completely closed. Through the gap formed between the opening region of the tappet shaft and the wall of the outlet opening, the fluid can pass from the fluid supply chamber through the outlet opening to the outside. Thus, the tappet head is arranged toward the outer side of the fluid supply chamber. For displacing the tappet from its closed position to its open position, the tappet is correspondingly moved in the direction toward the outer side or essentially in the outflow direction of the fluid. Thus, in the open position, part of the tappet shaft is still located at the level of its opening region inside the outlet opening. Thus, the tappet shaft is not pulled out of the outlet opening for opening the outlet opening. For displacement from the open position to the closed position, the tappet is correspondingly retracted toward the fluid supply chamber until the outlet opening is closed by the tappet head. Thus, the essential feature is that the tappet is pushed outward in the outflow direction for opening the outlet opening and retracted in the opposite direction for closing said opening.

Furthermore, the fluid delivery device according to the present invention comprises a displacement device by means of which the tappet can be moved between the closed position, in which the outlet opening is closed by the tappet, and the open position, in which the outlet opening is open for delivering fluid out of the fluid supply chamber. It is preferred that the displacement device is configured such that for moving the tappet into the open position it effects a linear displacement of the tappet in the outflow direction of the fluid, and that for moving said tappet into the closed position it effects a linear displacement of said tappet in the opposite direction of the outflow direction of the fluid, in particular, along the longitudinal axis of the tappet shaft.

Thus, all in all, in particular, the configuration of the tappet with a tappet head arranged at the end of the tappet shaft and an opening region adjoining the tappet head is one aspect of the present invention. Closure of the outlet opening is affected from the outside by means of the tappet head. In contrast, in the open state of the outlet opening the tappet is located with its opening region inside the outlet opening. As a result of the fact that the tappet does not need to be completely lifted out of the outlet opening in operation between the open position and the closed position, the stroke of the tappet can be configured smaller than in the prior art, reducing the installation space required for the fluid delivery device. At the same time, clogging of the outlet opening with ground material can be prevented since the tappet head, depending on the configuration thereof, acts as a lid of the outlet opening when viewed from the outside or pushes attached ground material out of and/or away from the outlet opening during the opening process. Thus, for opening and for cleaning the outlet opening, the tappet head is moved starting from the closed position in the same direction outward away from the outlet opening.

The outlet opening is a through recess or passage opening in the outer wall between the inner space of the fluid supply chamber and the outflow side of the fluid delivery device, through which recess or opening the fluid can flow outward out of the fluid supply chamber. To that end, the outlet opening may, for example, be fitted into an outer wall of the fluid supply chamber. Thus, with respect to the outlet opening, the term ‘inner’ refers to the opening side facing toward the inner side of the fluid supply chamber, while ‘outer’ refers to the opening side facing to the outer side, i.e., the outflow side. In the injection process, the fluid flows from the inner side to the outer side. In this instance, the spacial configuration of the outlet opening may vary. In the easiest case, the outlet opening has the shape of a hollow cylinder, however, other forms of outlet openings are possible as well and within the scope of the present invention. It is important that the tappet head and the recess are configured relative to one another at least partially such that the tappet head may close the recess in an essentially fluid-tight manner, particularly by means of a form-fit between the tappet head and the wall region delimiting the outlet opening. Furthermore, the shape of the outlet opening may also be used for influencing the injection pattern of the delivered fluid, for example, in that the outlet opening widens in a funnel-like manner toward the outer side, i.e., specifically comprises a portion shaped as a hollow truncated cone. Preferably, at least a part of the outlet opening, in particular, at least the inner portion of the outlet opening, is configured with a constant cross-section, for example, hollow-cylindrical. In contrast, at least the outer portion of the outlet opening is preferably configured with a cross-section widening toward the outer side, i.e., for example, in the manner of a hollow truncated cone.

In the closed position, the tappet head is used to close the outlet opening and to prevent fluid from flowing out of the fluid supply chamber through the outlet opening. To that end, also the tappet head may be configured in different ways. It is essential that its shaping ensures the closure of the outlet opening in the closed position. In the closed position, the outer wall and the tappet head preferably at least partially form a form fit in the closing direction, i.e., toward the interior of the fluid supply chamber. Here, the contact surfaces between the tappet head and the outer wall of the fluid supply chamber are the sealing surfaces of the valve formed by the outlet opening, the tappet head and the opening region, divided into outer wall sided sealing surface and complementary tappet—head sided sealing surface. Preferably, said sealing surfaces are each configured continuously as a ring extending completely around the outlet opening or the tappet head, respectively. At the outer wall side, the sealing surface may, for example, be disposed on the outer wall and extend around the outlet opening. For example, this is the case if the tappet head is configured such that it completely covers the outlet opening from the outside. However, the sealing surface may also be disposed inside the outlet opening. For example, this is the case if the wall of the outlet opening is not configured as a hollow cylinder but as a hollow cone and the tappet head is also configured in the shape of a cone such that it is at least partially, preferably completely, accommodated in the outlet opening in the closed position. This provides the advantage that the tappet head and particularly the functionally essential sealing surfaces at the outer wall and at the tappet head are particularly well protected from wear caused by the milled-off material moved in the work chamber.

The configuration according to one aspect of the present invention of the opening region enables that fluid flows through the outlet opening from the inner side to the outer side in the open position of the tappet even though the tappet is not pulled out of the outlet opening. Both the height of the opening region, i.e., its extension along the longitudinal axis of the tappet, and the cross-section of the opening region transversely to the opening direction are adapted to the geometry of the outlet opening. More precisely, the opening region has a cross-section which in the open position is completely ran around, i.e., encircled, by the cross-section of the outlet opening such that the opening region is configured narrower than the outlet opening. This ensures that there is at least a gap between the tappet and the outlet opening through which fluid can flow when the opening region is at the height of the outlet opening. Then, the tappet with respect to its opening region in a cross-sectional view is completely accommodated in the outlet opening but does not close said opening. For a hollow-cylindrical outlet opening, the opening region may also be configured as a cylinder, for example, which however has a smaller diameter than the outlet opening. Thus, the opening region is adapted to the spacial configuration of the outlet opening such that with said region a passage channel can be obtained through the outlet opening for supplying fluid. The opening region extends at least thus far along the tappet that the height of the opening region is greater than the longitudinal extension of the narrowest portion of the outlet opening.

It is ideal if the opening gap between the outlet opening and the opening region is variable and particularly can be changed by a displacement of the tappet. The cross-sectional area of the opening gap determines the available space for the fluid when flowing through the outlet opening. Provided that the volumetric flow rate of the fluid through the outlet opening is constant, a widening of the opening gap results in a lower velocity of the fluid in the outlet opening, while a narrowing of the opening gap results in a higher velocity of the fluid. Thus, the cross-sectional area of the opening gap has a direct effect on the velocity of the fluid when delivered, and thus on the injection pattern. In contrast, if the pressure of the fluid supply is constant, for example, the volumetric flow rate can be regulated by a change of the gap width or the opening cross-section thereof, respectively.

Of course, it is possible that the opening region extends from the base of the tappet head over the entire remaining height extension of the tappet in the closing direction. However, to enable a more massive and stable configuration of the tappet, it may be advantageous if a thickened tappet shaft compared to the opening region is formed on the tappet in the closing direction above the opening region. Further, an appropriate beveled or chamfered transition portion may be configured between the opening region and the tappet shaft.

With respect to the exact configuration of the tappet head and the closure portion, some refinements described in more detail hereafter have proven to be particularly advantageous. Both the geometry of the tappet head and the geometry of the outlet opening have a significant influence on the injection pattern. Against this background, the outlet opening may, for example, have an outer closure portion, which is widened compared to the outlet opening, particularly widening toward the outer side in a funnel-like manner. Said closure portion fulfills two functions. On the one hand, it may serve as a protection for the tappet head in that the tappet head is at least partially configured as complementary to the closure portion of the outlet opening so that the tappet head in the closed position rests against the closure portion at least partially in a form fitting manner. This way, sealing surfaces may be disposed inside the closure portion, i.e., inside the outlet opening, where they are protected from wear caused by the milled-off material moved in the work chamber by means of their embedded position and the fluid flowing out. On the other hand, the funnel-type closure portion effects a wider injection pattern of the fluid flowing out, in particular, in connection with the complementary tappet head. This way, the exact configuration of the geometry of the closure portion and, where applicable, of the complementary tappet head may serve to adapt the injection pattern of the delivered fluid as required.

For example, in the closure portion the outlet opening may be configured in the type of a hollow truncated cone and the tappet head may be configured in the type of a complementary truncated cone. In this embodiment, the closure portion and the tappet head each have a circular cross-section perpendicular to the closing direction, the tappet head widening in the opening direction. Valve heads having a cross-section profile which is linear in sections, such as valve heads in the shape of a truncated cone, have thus far proven to be advantageous, however they are not obligatory. Alternatively, the tappet head may be configured in the shape of a truncated pyramid, a truncated ellipsoid, a truncated sphere, a truncated paraboloid or a truncated hyperboloid as well. This is relevant in that the profile of the tappet head has an influence on the injection pattern of the delivered fluid, so that a particularly advantageous injection pattern can be obtained by means of the corresponding configuration of the tappet head, for example. All of these variants are particularly suited for realizing embodiments having a variable opening cross-section.

The main object of the displacement device is to enable the controlled displacing movement of the tappet, in particular, linear along the longitudinal axis of the tappet shaft, between the closed position and the open position. Additionally, the displacement device may further be configured for holding the tappet in the desired position. The tappet and the tappet head formed thereon are displaced preferably linearly along a displacement axis by means of the displacement device. It is particularly advantageous if the displacement axis extends perpendicularly to the outlet opening, i.e., for example, in the case of a hollow-cylindrically formed outlet opening, the displacement axis runs parallel to the side walls of the hollow cylinder. The tappet may be displaced along said adjustment axis in two directions, which are referred to with the terms 'closing direction' and 'opening direction'. Both the closing direction and the opening direction run parallel to the displacement axis. In this regard, according to one aspect of the present invention, when viewed from the outlet opening, the closing direction is oriented toward the interior of the fluid supply chamber, and that, when viewed from the outlet opening, the opening direction is oriented toward the outside away from the outlet opening. Thus, when being displaced from the open position into the closed position, the tappet is retracted, or pulled, into the fluid supply chamber until the tappet head reaches a position in which it closes the outlet opening. To that end, the tappet head preferably establishes a form fit with the outer wall of the fluid supply chamber or the wall of the outlet opening in the closing direction, limiting the movement of the tappet in the closing direction. The movement described is the closing movement of the tappet head or the tappet, respectively.

Preferably, the fluid delivery device according to the present invention is configured such that besides the above described closing movement of the tappet head or the tappet it can also effect an opening movement of the tappet head or the tappet. The opening movement consists in the tappet, and thus the tappet head, being moved from its closed position in the opening direction into an open position. When viewed from the outlet opening, the tappet head is in this case pushed outward, i.e., away from the fluid supply chamber. However, it is not mandatory that the above mentioned opening movement is effected by the displacement device; it can also be obtained in a different way depending on the configuration of the tappet, for example, by increasing the internal pressure of the fluid supply chamber.

The adjustment of the tappet may be effected in an active or passive manner. Passive adjustment as defined by the present invention means that no separate drive device is used for displacing the tappet. For example, the fluid pressure applied to the tappet may be used, in particular, in combination with a spring load acting in the closing direction, as will be explained in more detail below. Thus, for an active displacement, the displacement device includes a drive, for example, a piston-cylinder unit or an actuator. For this purpose, the displacement device may particularly be driven electrically, hydraulically or pneumatically. For example, the displacement device may comprise an electric motor. Electric motors enable particularly fast and precise displacement movements and have a high energy efficiency compared to hydraulic and pneumatic solutions. Likewise, the displacement device may comprise a piston-cylinder unit which is driven electrically, pneumatically or hydraulically. In particular, hydraulic systems are often already present in ground milling machines, for example, in order to affect stroke or pivot movements of the milling drum or the milling drum box. Since such stroke or pivot movements usually do not have to be effected simultaneously with the opening of the delivery of fluid into the work chamber, the already existing hydraulic pumps for the lifting and pivoting device of the milling drum may advantageously additionally be used for the operation of the displacement devices, whereby a more efficient use of capacities may be achieved. Ideally, the drive is configured such that it can apply a force acting in the opening direction at least onto the tappet. The corresponding reverse displacement into the closed position can be effected by spring loading as well.

A spring load of this type provides the advantage that its effectiveness does not depend on a constant supply of energy. Thus, a force acts on the tappet in the closing direction regardless of the operational state of the ground milling machine. In connection with the above mentioned form fit between the tappet head and the outer wall of the fluid supply chamber, this force results in the tappet head being fixed in the closing position. This is true at least for as long as the tappet is not loaded with another force, the part of which force acting in the opening direction being at least as great as the spring load generated force acting in the closing direction.

The displacement device serves to displace the tappet, and thus the opening region and the tappet head, along the displacement axis. Depending on the configuration of the displacement device, a discrete number of positions or a continuous displacement range may be provided, in which the tappet is freely displaceable in a linear manner. Multiple displacement ranges are possible as well, for example, an open displacement range and a closed displacement range, or an open displacement range and a single closed position. Various positions and displacement ranges may further be characterized by further features. For example, there may be an optimum open displacement range which is characterized in that, in a position of the tappet inside said range, the effective width of the opening gap is at its maximum. However, in any case the tappet can assume at least one closed position and at least one open position. Also, the displacement of the tappet in both the closing direction and the opening direction is in any case limited. Thus, there are both a maximum retracted position of the tappet, in which the displacement of the tappet is maximal in the closing direction, and a maximum extended position of the tappet, in which the displacement of the tappet is maximal in the opening direction. According to one aspect of the present invention, the maximum retracted position of the tappet is, in particular, always also a closing position.

The displacement device may additionally also comprise a stop element which prevents the displacement of the tappet from the closed position in the opening direction beyond a stop position. The counter element of the stop element is formed by a stop against which the stop element strikes and which thus functions as a displacement path limitation. Since the stop element does not allow extending the tappet beyond the stop position, in this case the maximum extended position of the tappet inevitably corresponds to the stop position. It is particularly expedient if the stop element is arranged such that the resulting stop position is at the same time also a position in which the outlet opening is maximally opened. In other words, the stop element can particularly preferably be arranged such that in the resulting stop position the opening gap is as wide as possible at its narrowest point, i.e., the effective width of the opening gap is maximal. With respect to the maximum extended position of the tappet, it may be advantageous if the opening width of the outlet opening is also maximal in said maximum extended position so that, for example, unintended displacement of the tappet beyond an optimum open displacement range is prevented.

During the milling process, great amounts of milled-off material are often moved by the milling drum inside the work chamber at a high velocity and in a constricted space, which is why all parts of the ground milling machine arranged in or at the work chamber are subject to wear caused by the milled-off material. This also applies to the fluid delivery device and particularly to the tappet extended in the open position and the tappet head formed thereon.

Thus, in a preferred embodiment a tappet protection device is arranged on the outer side of the fluid delivery device next to the outlet opening. Said protection device includes, for example, a guide surface for deflecting milled-off material which is arranged such that it deflects milled material moved transversely to the closing direction at least partially in a direction that leads away from the tappet. In this instance, the essential function is the protection of the tappet head when said head is not completely accommodated in the outlet opening. In some embodiments, this is the case particularly in the open position when the tappet head has been extended for delivering fluid. However, embodiments are also envisaged in which the tappet head benefits from such a tappet protection device in the closed position as well, for example, if the tappet head completely covers the outlet opening from outside, i.e., if the sealing surfaces are located adjacent to the outlet opening. A great number of variations are conceivable with respect to the exact configuration of the guide surface. For example, the guide surface may be arranged ring-shaped and outwardly inclined around the outlet opening, wherein the profile of the guide surface, parallel to the closing direction, may be either even or curved in a convex or concave manner. As an alternative, the outlet opening may also include an outlet region toward the outside, which region the tappet head is countersunk into also in the open position. In other words, the outlet region is a recess which is large enough to leave a free space through which water can escape outward even with the accommodated tappet head. Thus, in this embodiment, even in its open position the tappet head does not project from the outer side of the outlet opening.

Furthermore, the object is achieved by means of an injection device comprising at least two of the above described fluid delivery devices, a line system for, ideally common, fluid supply of the at least two fluid delivery devices, and a control unit. In this instance, the control unit is configured for the control, in particular, the individual control, of the displacement devices of the at least two fluid delivery devices. Individual control means that the displacement devices can be controlled individually and independently of one another by means of the control unit, and thus, for example, the respective position of the tappet of the at least two fluid delivery devices is adjustable independently of one another. Thus, in particular, the outlet opening of a fluid delivery device can be closed, while the outlet opening of another fluid delivery device is open. In particular, if the at least two fluid delivery devices comprise a common fluid supply chamber, for example, if said chamber is configured as an injection beam or as a ring line with multiple outlet openings, such an individual control can, for example, be used for delivering fluid cyclically from the individual fluid delivery devices or for delivering fluid depending on the current working conditions, for example, only in the lateral region of a milling drum box, etc.

The object underlying the present invention can also be achieved by a ground milling machine comprising an injection device as described above.

Finally, the object of the present invention is achieved by a method for controlling an opening state of a fluid delivery device of a ground milling machine having a tappet that can be adjusted between a closed position and an open position, in particular, a fluid delivery device as described above. Said method includes an opening process by means of which the tappet is moved from the closed position into the open position, and a closing process by means of which the tappet is moved from the open position into the closed position. Preferably, there is exactly one closed position, while ideally multiple open positions may be provided, by means of which different opening degrees of the fluid delivery device are enabled. In this instance, both a discrete number of possible open positions and a continuous range of open positions are possible.

The opening process, i.e., moving the tappet from the closed position into the open position, includes multiple steps, starting with an application of force to the tappet in the opening direction. Said force application effects that the tappet is moved outward when viewed from the outlet opening. As a result, the tappet head is moved in an open position partially opening the outlet opening. Thus, an opening of the outlet opening is affected, so that fluid can escape outward from the fluid supply chamber.

The closing process, i.e., moving the tappet from the open position into the closed position, also includes multiple steps. In analogy to the opening process, the closing process starts with a force application to the tappet, however in the closing direction. As a result, the tappet is moved in the direction inward to the outlet opening. This effects a movement of the tappet head into a closed position in which the tappet head closes the outlet opening. To that end, contacting of the tappet head on the outer wall of the fluid supply chamber via sealing surfaces is affected.

Variants of the method according to the present invention can be carried out, for example, with respect to the manner in which force is respectively applied to the tappet. For example, the opening process may further include the step of pumping fluid into the fluid supply chamber until the pressure in the fluid supply chamber exceeds a lower pressure threshold value. This leads to a force application to the tappet in the opening direction by means of the internal pressure of the fluid supply chamber. Likewise, the closing process may include the step of reducing the pressure in the fluid supply chamber below the above mentioned lower pressure threshold value. The force application to the tappet in the closing direction is then effected by means of a restoring spring. Said restoring spring continuously exerts a force acting on the tappet in the closing direction. Thus, an increase of the internal pressure of the fluid supply chamber above the lower pressure threshold value effects that the magnitude of the force acting on the tappet in the opening direction by means of the internal pressure is greater than the magnitude of the force acting on the tappet in the closing direction by means of the restoring spring, and the opening process is initiated. In contrast, a decrease of the internal pressure of the fluid supply chamber below the lower pressure threshold value results in the magnitude of the force acting on the tappet in the opening direction by means of the internal pressure dropping below the magnitude of the force acting on the tappet in the closing direction by means of the restoring spring, and the closing process is initiated. Thus, the opening and closing process of the fluid supply chamber can be controlled by solely regulating the internal pressure of the fluid supply chamber. For example, this provides the advantage that additional displacement or control devices are not required for the tappet, and thus no additional energy needs to be spent for displacing the tappet.

Alternatively or additionally, according to another embodiment of the method according to the present invention, the opening process may include the steps of transferring a control signal to the displacement device, which thereupon exerts a force on the tappet, which, depending on the signal, acts in the opening or closing direction. This way, the opening or closing process, respectively, according to the further steps indicated above can be initiated. In this embodiment of the method, the control of the opening and closing process of the fluid supply chamber is realized by means of the control of the displacement device and can thus also be affected independently of the internal pressure of the fluid supply chamber. Besides the option of the independent control, this is further advantageous, for example, in that the closing position and various open positions can more directly and precisely be controlled.

BRIEF DESCRIPTION OF THE DRAWINGS

Various exemplary embodiments of the present invention will be described in greater detail below with reference to the drawings. However, the present invention is not limited to these exemplary embodiments, so that further combinations and applications are possible and also included in the scope of the present invention. In the schematic drawings, in which like reference numerals refer to constructionally or functionally like components.

DETAILED DESCRIPTION OF THE INVENTION

Figure 1:
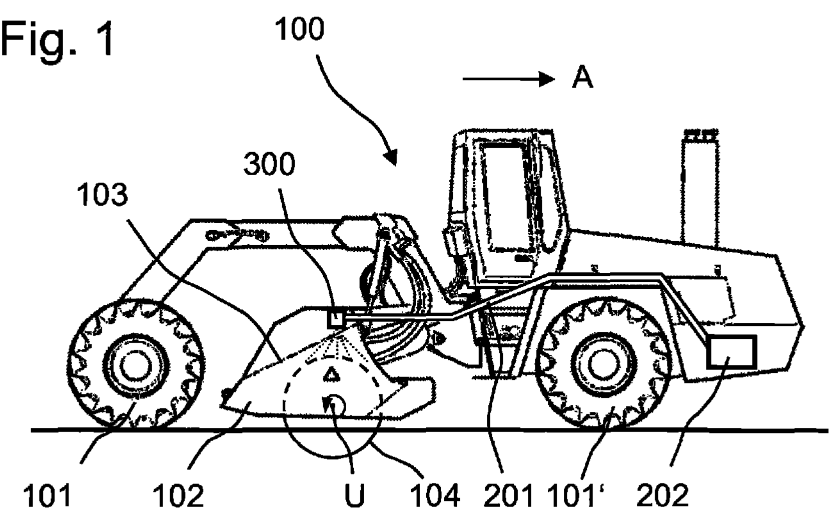
FIG. 1 shows a ground milling machine having an injection device in a side view.

FIG. 1 shows a self-propelled ground milling machine 100 with travelling devices 101, 101'. In working operation, the ground milling machine 100 moves in the working direction A and mills off ground material. To that end, a milling device is provided, comprising a milling drum box 102 having a work chamber 103 in the interior of the milling drum box 102 for a milling drum 104 which rotates in the circumferential direction U in working operation. On the inner side of the milling drum box 102 above the milling drum 104, a fluid delivery device 300 is mounted which is supplied with fluid from a fluid tank 202 via a line system 201. Thus, by means of the fluid delivery device 300, fluid can be delivered into the work chamber 103, where it can be mixed with the milled-off ground material by the rotating milling drum 104.

The fluid tank 202 can be arranged directly on the self-propelled ground milling machine 100, as illustrated in FIG. 1. It is, however, preferably located on a separate fluid tanker (not shown), for example, a water tanker or a binder tanker, from which the fluid is pumped into the line system 201 of the ground milling machine 100 by means of a self-priming pump (not shown) mounted on the ground milling machine 100.

FIGS. 2 to 5 show an embodiment of a fluid delivery device 300, where in the course of FIGS. 2 to 4*b* different states of an opening process 410 of the outlet opening 320 from the closed position (in FIG. 2) to a first open position (in FIGS. 3*a*/3*b*) up to a maximum open position (FIGS. 4*a*/4*b*) and, in the case that the movement is continued, up to a maximum extended position of a tappet 330 with a tappet head 331 are illustrated. Thus, the tappet 330 is configured to be displaceable along its longitudinal axis L. FIGS. 2 to 6*a* and 7 to 11 are in each case cross-sectional views through a fluid delivery device, the sectional plane extending on a longitudinal axis L along the shaft of the tappet 330.

The fluid delivery device 300 comprises a wall-surrounded fluid supply chamber 310, the outer wall 311 of which is broken through by an outlet opening 320, through which the fluid can be delivered to the outside of the fluid supply chamber 310, for example, into the work chamber 103 of the ground milling machine 100 (FIG. 1). The outlet opening 320 is closed by the tappet head 331 of the tappet 330 in the closed position. A force is applied to the tappet 330 for controlling its displacement position by means of a displacement device 340, which may comprise a restoring device 341. In the embodiment shown, the displacement device is configured as a hydraulic piston-cylinder unit, the restoring device 341 as a restoring pressure spring. In this instance, the tappet shaft is formed integrally with the piston face 335.

Figure 2:
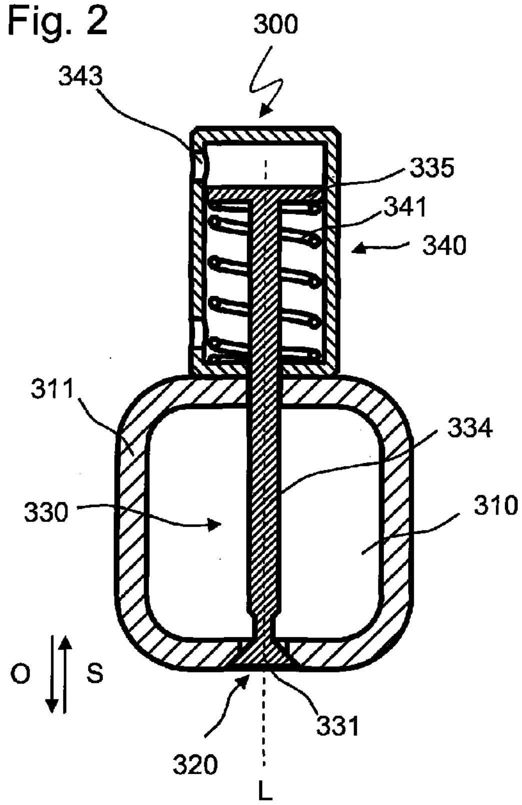
FIG. 2 shows a fluid delivery device with a countersinkable tappet head in the closed position in a cross-sectional view along the displacement axis.
Figure 3A:
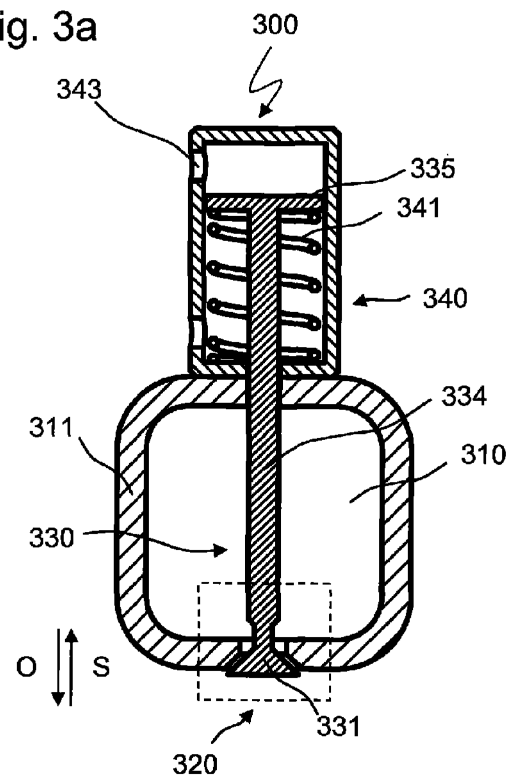
FIG. 3*a* shows the fluid delivery device of FIG. 2 in open position in a cross-sectional view along the displacement axis.
Figure 4A:
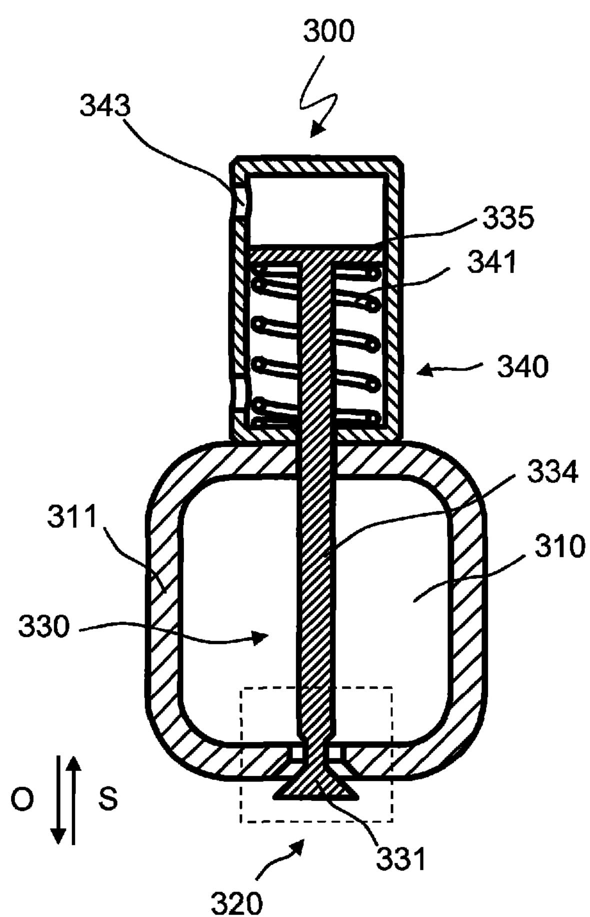
FIG. 4*a* shows the fluid delivery device of FIGS. 2 to 3*b* in the maximum open position in a cross-sectional view along the displacement axis.

FIGS. 2, 3*a* and 4*a* illustrate an opening process in the sequence order mentioned. In this instance, the movement direction of the tappet in direction toward the open position is marked with O and the respective counter direction in the closing direction is marked with S. During the opening process 410, the displacement device 340 exerts a force onto the tappet 330 in the opening direction O. As a result, the tappet 330 is moved in the opening direction O starting from the closed position in FIG. 2. In this process, the restoring pressure spring is further compressed and thus continuously exerts a force onto the tappet 330 in the closing direction S, which force increases along with the continuing displacement movement. As long as the force acting in the opening direction O is greater than the force acting in the closing direction S, the tappet 330 is further extended. If the force acting in the opening direction O is reduced until an equilibrium of the force in the opening direction O applied by the adjustment device 340 and the force exerted onto the tappet 330 in the closing direction by the restoring pressure spring is reached, the tappet 330 and thus the tappet head 331 is held in the current position, for example, in the position P3 shown in FIG. 3*a*. If the force exerted onto the tappet 330 in the opening direction O by means of the displacement device 340 is further reduced so that the force acting onto the tappet 330 in the closing direction S is greater, the movement of the tappet 330 is reversed and said tappet is retracted until it reaches the closed position P1 as illustrated in FIG. 2.

Figure 3B:
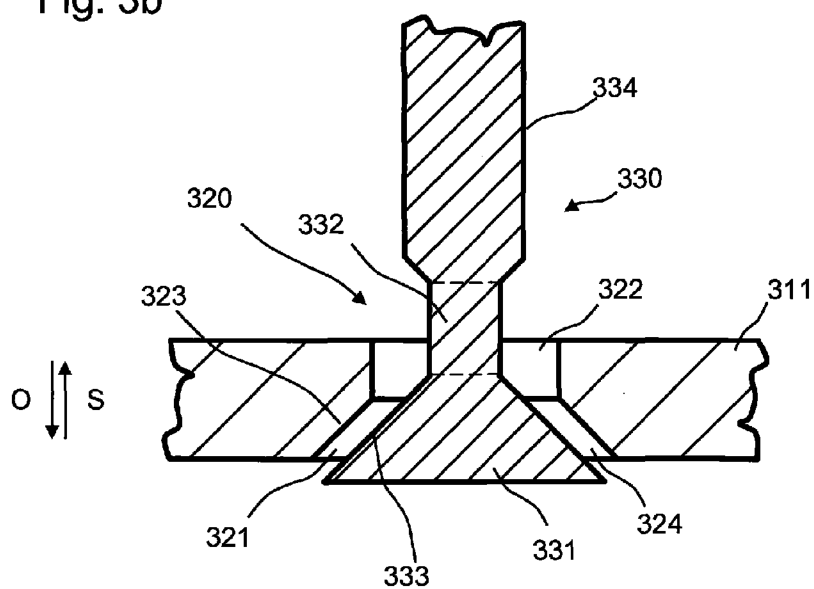
FIG. 3*b* shows an enlarged detail of FIG. 3*a;*
Figure 4B:
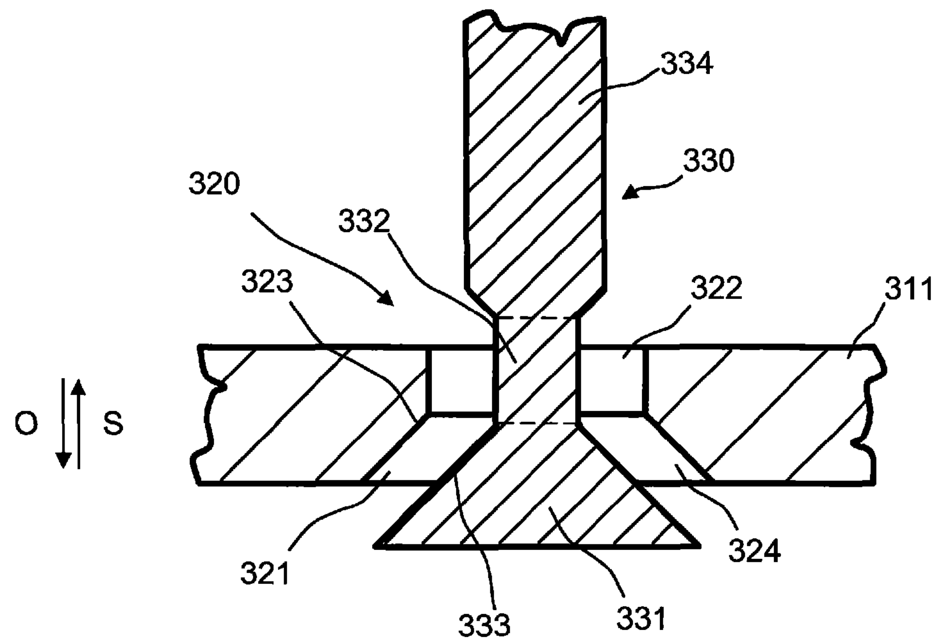
FIG. 4*b* shows an enlarged detail of FIG. 4*a;*

FIGS. 3*b* and 4*b* are in each case enlarged partial views of the dashed line framed region shown in FIGS. 3*a* and 4*a* and illustrate the interplay of the outlet opening and the tappet 330. The essentially rod-shaped tappet 330 comprises, on the one hand, an opening region 332 toward its end region, and an adjoining tappet head 331. In the opening region 332 the tappet 330 is configured narrower than the outlet opening 320 and in the region of the tappet head 331 it is configured wider than the outlet opening 320, in each case viewed in the cross-section perpendicular to the tappet longitudinal axis L. In the embodiment shown, the outlet opening 320 per se consists of two portions, a hollow-cylindrical portion 322 and a closure portion 321 in the form of a hollow truncated cone widening in the outlet direction. Between the opening region 332 and the outer wall 311, in the region of the outlet opening not filled by the tappet 330, there is an annular gap already shown in the closed position P1 in FIG. 2. In contrast, the closure portion 321 in the form of a hollow truncated cone is still closed by the tappet head 331 in the closed position P1, with the circumferential sealing surface 333 of the tappet head resting against the circumferential sealing surface 323 of the closure portion 321. As a result, the outlet opening 320 is sealed to the outside by the tappet head in the closed position and fluid cannot get from the inside of the outlet opening through the latter to the outside.

During the opening process the tappet 330, and thus the tappet head 331, is now pushed outward out of the outlet opening 320, for example, by means of the displacement device 340, as illustrated in FIGS. 3*a* and 3*b*. As a result, the opening region 332 is pushed further into the outlet opening 320 and a ring-shaped gap 324 is maintained, through which fluid coming from the inner space can pass through the outlet opening 320 to the outside.

What is preferred in the present exemplary embodiment is, inter alia, the fact that the width of the opening gap transversely to the passage flow direction of the fluid can be varied by a variation of the relative position of the tappet 330 relative to the outlet opening 320, whereby, for example, the flow volume and/or the injection pattern can be varied. In the FIGS. 4*a* and 4*b*, the relative position of the tappet and the outlet opening to one another is shown in which the opening gap 324 has reached a maximum effective width. At constant pressure, in said position the volumetric flow rate through the outlet opening is maximum. In the present case, the width of the opening gap 324 is determined at a specific point of the displacement axis inside the outlet opening 320 via the cross-sectional area of the opening gap 324 perpendicular to the displacement axis. The effective width of the opening gap 324 is determined by the minimum of all said surfaces, i.e., the minimum of the width of the opening gap 324 at all points of the displacement axis inside the outlet opening 320. In the exemplary embodiment shown in FIG. 4*b*, there is not only one single maximum open position but a displacement range in which the width of the opening gap 324 is maximum. However, if the tappet 330 is pushed outward or inward beyond said displacement range through the outlet opening 320, the tappet shaft 334, which is widened compared to the opening region 332, gets into the outlet opening 320 and the effective width of the opening gap 324 decreases.

Figure 5:
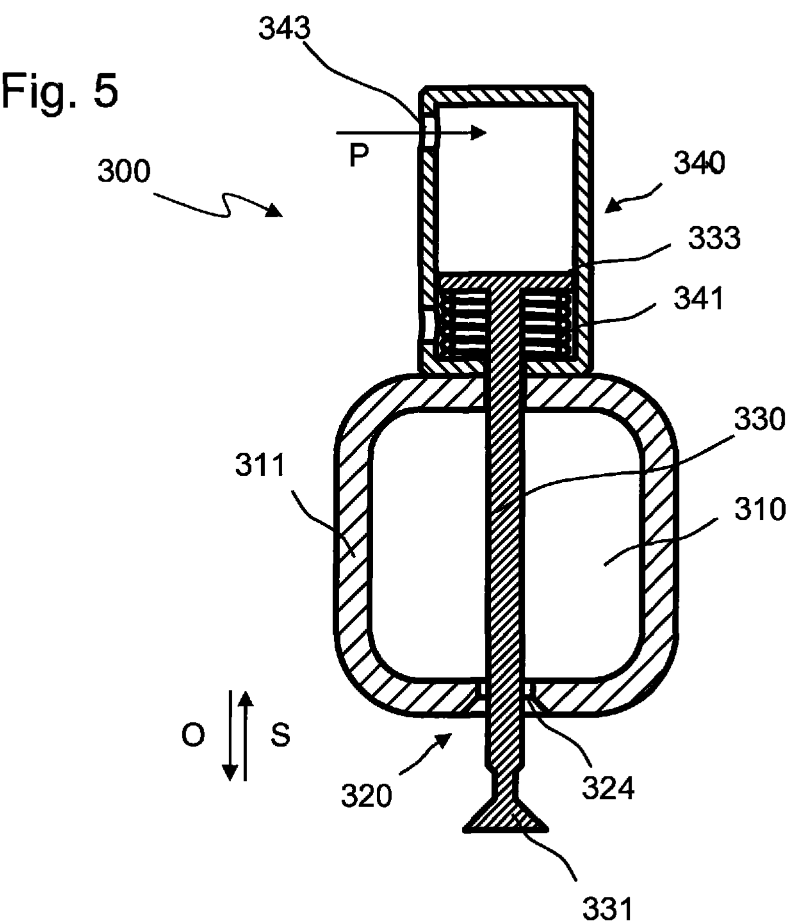
FIG. 5 shows the fluid delivery device of FIGS. 2 to 5 and 7*a* to 7*b* having a tappet in the maximum extended position in a cross-sectional view along the displacement axis.

In the exemplary embodiment of the fluid delivery device 300 shown, it is also possible to displace the tappet 330 into a maximum extended position reaching beyond the position with the maximum opening cross-section. Such a maximum extended position of the tappet 330 is illustrated in FIG. 5. In the embodiment shown, the restoring pressure spring is maximally compressed so that the piston face 335, the restoring pressure spring and the base of the piston-cylinder unit form a form fit in the opening direction O, preventing a further extension of the tappet 330. As a result of said over stroke of the tappet 330 beyond the maximum open position, dirt accumulated in front of the outlet opening 320, for example, can be loosened and removed. In an advantageous manner, in the embodiment according to the present invention, the pressure of the delivered fluid can be used complementary to the direct mechanical effect of the tappet 330 for loosening the dirt. This is enabled in that even in the maximum extended position P5 a sufficient opening gap 324 is maintained between the tappet shaft 334 and the outer wall 311, through which gap fluid can be delivered.

Figure 6A:
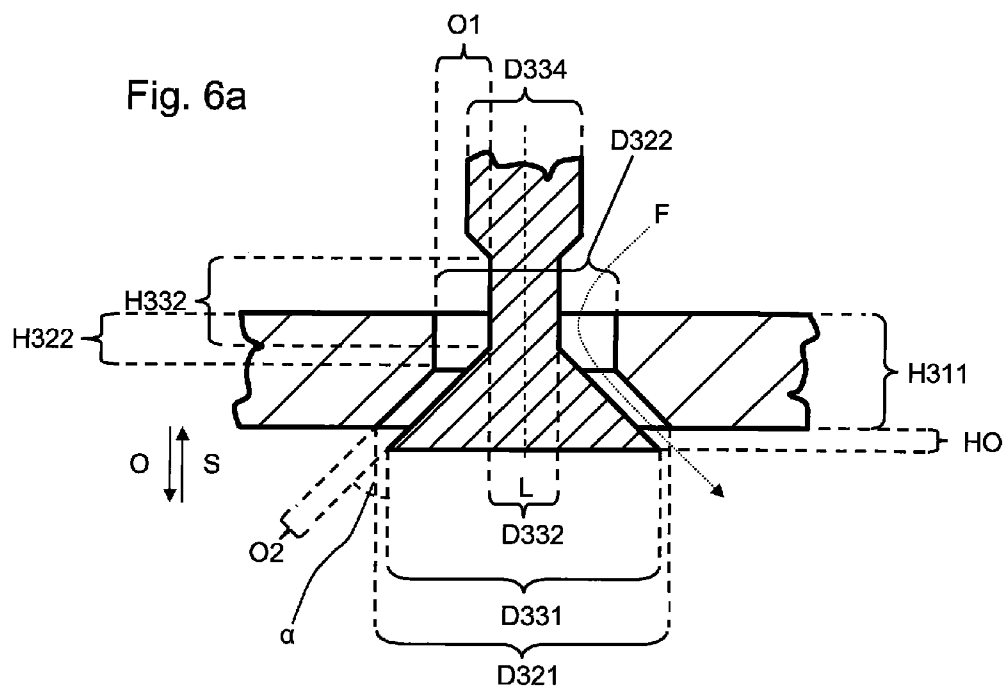
FIG. 6*a* shows an enlarged detail of FIG. 2.
Figure 6B:
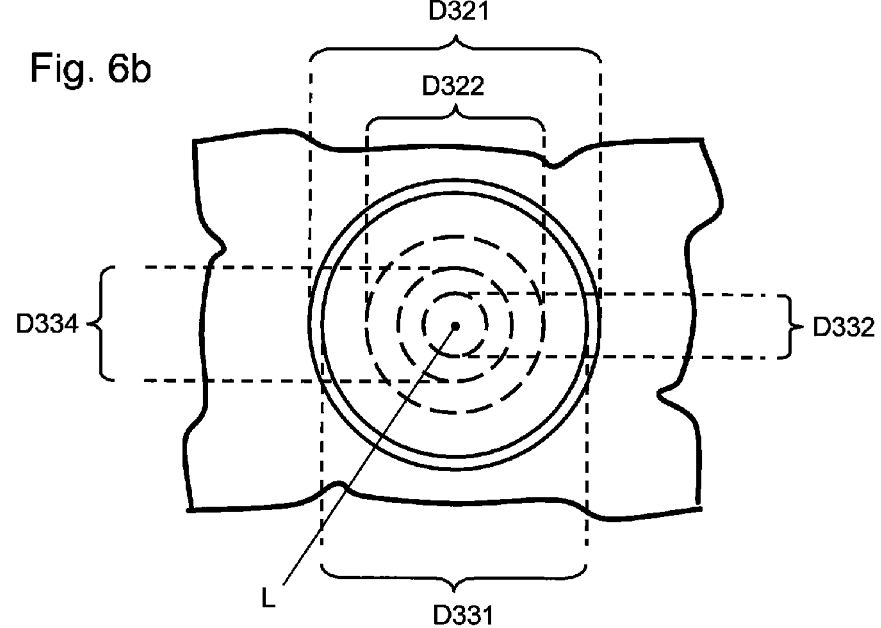
FIG. 6*b* shows the fluid delivery device of FIGS. 2 to 5 and 7*a* in the cross-section perpendicular to the displacement axis through the outlet opening.

FIGS. 6*a* and 6*b* explain the proportions between the above mentioned individual elements and illustrate their interplay. FIG. 6*a* shows the region of the outlet opening in a cross-sectional view along the displacement axis L, while FIG. 6*b* shows the region in a top view in the direction of the displacement axis in the closing direction S, i.e., from below compared to FIG. 6*b*.

The outlet opening 320 and the tappet 330 each have a circular profile and are arranged concentrically on the displacement axis L. The maximum diameter of the outlet opening 320 is the maximum diameter D321 of the hollow truncated cone shaped closure portion 321. The tappet head is the widest part of the tappet, and therefore the maximum diameter of the tappet 330 is identical to the maximum diameter D331 of the tappet head 331. When viewed in the closing direction, the tappet head 331 is followed by the narrower opening region 332 having a diameter D332. D332 is smaller than the diameter D322 of the hollow-cylindrical portion 322 of the outlet opening 320. The height H332 of the opening region 332 is greater than the height H322 of the hollow-cylindrical portion 322 of the outlet opening 320 so that the opening region 332 can fulfill its opening function. Via a chamfered or beveled transition, the opening region 332 is followed by the tappet shaft 334, which is wider compared to the opening region 332, and the diameter D334 of which is greater than the diameter D332 of the opening region 332, however, less than the diameter D322 of the hollow-cylindrical portion 322 of the outlet opening.

The width of the opening gap 324 depends on the position of the tappet 330. In the position shown in FIG. 6a, the opening gap 324 extends between the outer wall 311 of the fluid supply chamber 310 on the one side and the tappet head 331 and the opening region 332 on the other side. In the position shown, the opening gap 324 has an upper portion and a lower portion, each having a different width. Here, the width of the opening gap 324 is to be understood as the content of the sectional area of the opening gap 324 transversely to the flow direction of the fluid through the opening, which is indicated by a dotted arrow F in the cross-section in FIG. 6a. In the example shown, the width of the upper portion can be determined approximately by means of the diameters D332 and D322, the width of the lower portion can be determined by means of the angle $\alpha$ of the sealing surfaces 323, 333 relative to the displacement axis, the adjustment height HO from the closed position P1, and the diameters D331 and D321.

FIG. 6b further illustrates these proportions. Accordingly, the maximum diameter D321 of the hollow truncated cone shaped closure portion 321 is greater than the maximum diameter D331 of the truncated cone shaped tappet head 331, the latter diameter being greater than the diameter D322 of the hollow-cylindrical closure portion 322, the latter being greater than the diameter D334 of the tappet shaft, and the latter being greater than the diameter D332 of the opening region. Thus, the tappet shaft 334 and the opening region 332 can be moved through both portions 321, 322 of the outlet opening 320, while the tappet head 331 can be moved into the closure portion 321, but not through said portion, and neither through the hollow-cylindrical portion 322 of the outlet opening 320. Thus, the tappet head 331 has to be located at least partially outside the fluid supply chamber 310 at any time.

Figure 7:
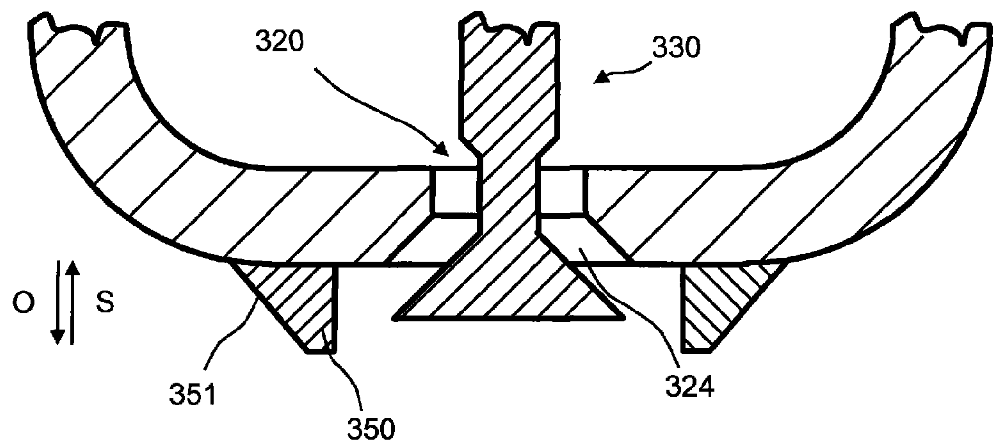
FIG. 7 shows a part of the fluid delivery device of FIGS. 2 to 4*b* having an additional tappet protection device in the open position in a cross-sectional view along the displacement axis.

FIG. 7 illustrates an embodiment of the fluid delivery device 300 according to the present invention comprising a tappet protection 350 arranged next to the outlet opening. In the embodiment shown, the tappet protection 350 is arranged in the form of a ring around the outlet opening 320 and has a circumferential, ring-shaped guide surface 351. The essential function of the guide surface 351 is to deflect the milled material away from the tappet head 331 in order to prevent abrasion on the tappet head. In the present exemplary embodiment, the tappet protection 351 projects in the opening direction O so far that in this direction it protrudes beyond the tappet even when the latter is in the open position.

Figure 8:
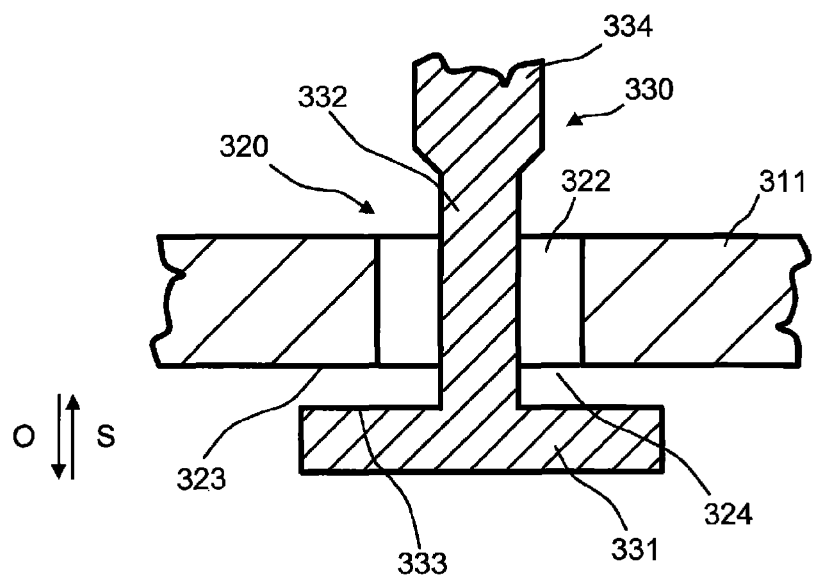
FIG. 8 shows a part of another exemplary embodiment of a fluid delivery device having a non-countersinkable tappet head in open position in a cross-sectional view along the displacement axis.

FIG. 8 relates to another refinement of the fluid delivery device 300 according to the present invention, wherein the tappet head 331 is shaped as a disc and rests against the outer wall 311 of the fluid supply chamber 310 from the outside in the closed position P1. In this instance, the outlet opening 320 is configured completely hollow-cylindrically and, in the closing direction, is completely covered by the tappet head when the latter is in the closed position (not shown in FIG. 8). Thus, the sealing surfaces 323, 333 are not located inside the outlet opening 320 but at the outer side of the outer wall 311 and at the side of the tappet head 331 facing inward, perpendicular to the displacement axis L. The opening gap 324 has a vertical upper portion (between the opening region 332 and the outer wall 311) as well as an adjoining horizontal lower portion (between the tappet head 331 and the outer wall 311). Apart from the differences described, the fluid delivery device 300 and thus also its functionality is identical to the exemplary embodiment shown in FIGS. 2 to 5.

Figure 9:
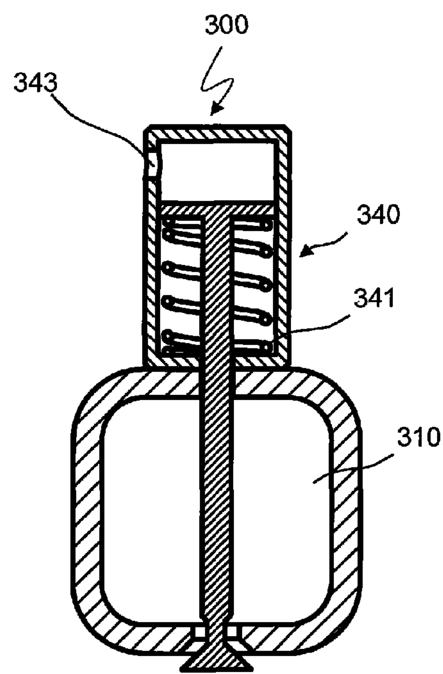
FIG. 9 shows an exemplary embodiment of a fluid delivery device having a pneumatically driven piston-cylinder unit in a cross-sectional view along the displacement axis.
Figure 10:
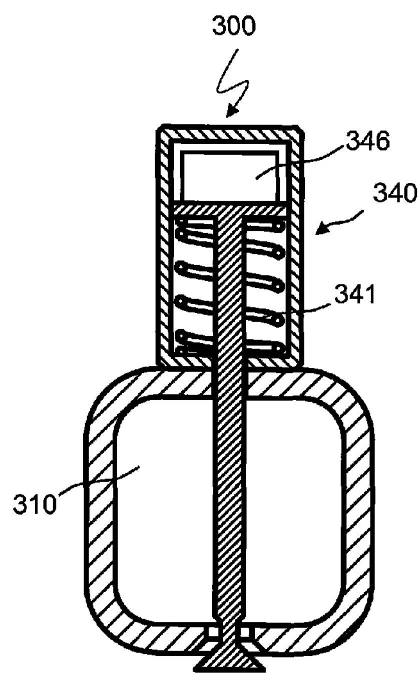
FIG. 10 shows another exemplary embodiment of a fluid delivery device having an electric motor and an electrically driven piston-cylinder unit, in a cross-sectional view along the displacement axis.
Figure 11:
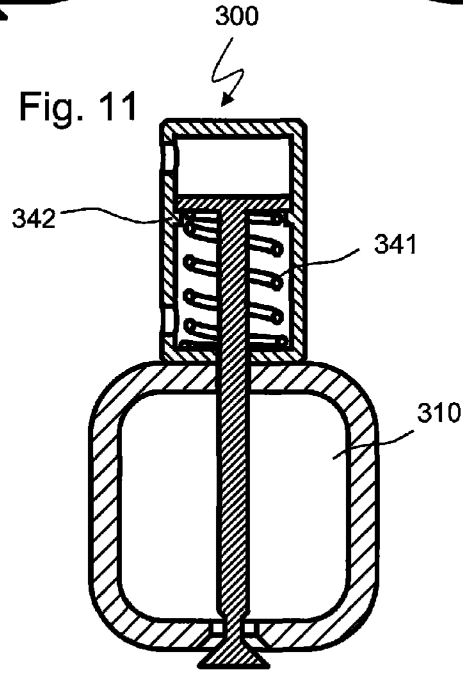
FIG. 11 shows another exemplary embodiment of a fluid delivery device having a hydraulically driven piston-cylinder unit, in a cross-sectional view along the displacement axis.

FIGS. 9 to 11 illustrate various embodiments of the displacement device 340. In all of the cases shown, this is a piston-cylinder unit comprising a restoring device 341 configured as a restoring pressure spring. Thus, the restoring pressure spring acts in the closing direction. In FIG. 9, the cylinder is configured as a single-acting, pneumatically driven cylinder having only one inlet opening 343. The displacement force required for driving the tappet 330 from the open position back into the closed position is applied by the restoring pressure spring and is directly transferred onto the tappet.

In contrast thereto, in the exemplary embodiment according to FIG. 10, the piston-cylinder unit is electrically driven and comprises an electric motor 346 by means of which the tappet 330 can be displaced both in the closing direction S and the opening direction O. This way, displacement of the tappet 330 can be achieved in a particularly precise and fast manner. Thus, for example, in connection with a control unit 203, more complex opening and closing cycles may also be coordinated particularly well, such as cyclic closing and opening of multiple outlet openings 320 according to a predefined sequence. Furthermore, this embodiment is suited for holding the tappet in intermediate positions as well.

The exemplary embodiment according to FIG. 11 is based on the exemplary embodiment of FIG. 9 and is characterized by a stop element 342 which limits the movement of the piston face 335 formed on the tappet 330 in the opening direction O. As a result, the displacement path of the tappet 330 and the opening region 332 and the tappet head 331 formed thereon is limited in the opening direction O.

Figure 12:
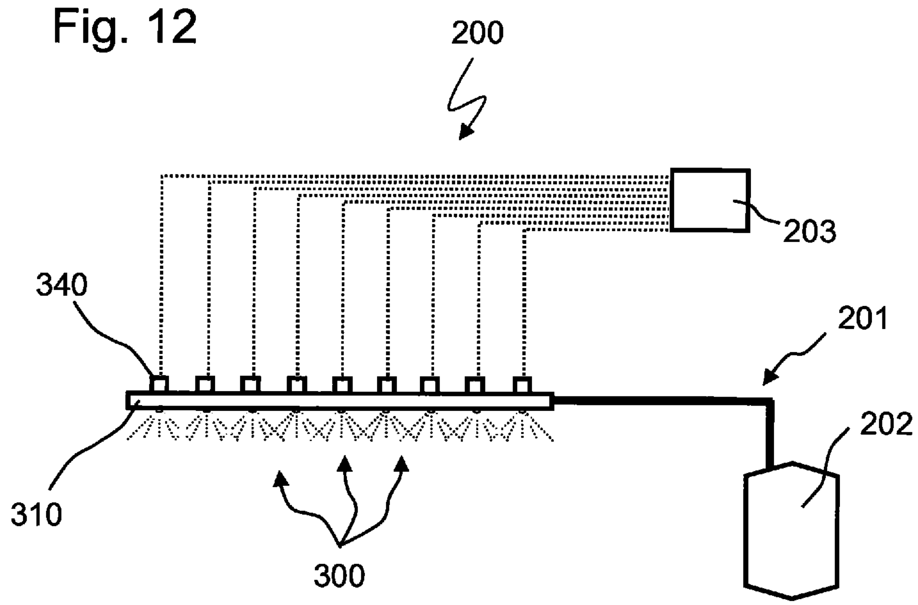
FIG. 12 shows an injection device in a schematic illustration.

FIG. 12 illustrates an option of how multiple fluid delivery devices 300 are used as part of an injection device 200. In the case shown, the fluid delivery devices 300 have a common fluid supply chamber 310 which, as a whole, is configured as a beam. Multiple outlet openings 320 are arranged on said injection beam, the opening state of which openings is in each case determined by the position of a tappet 330 with a tappet head 331. Each of the tappets 330 is linearly displaced by a displacement device 340, the displacement devices 340 all being individually controlled by a central control unit 203. The fluid supply of the fluid delivery devices 300 is affected through a line system 201, to which a fluid tank 202 is connected.

Figure 13:
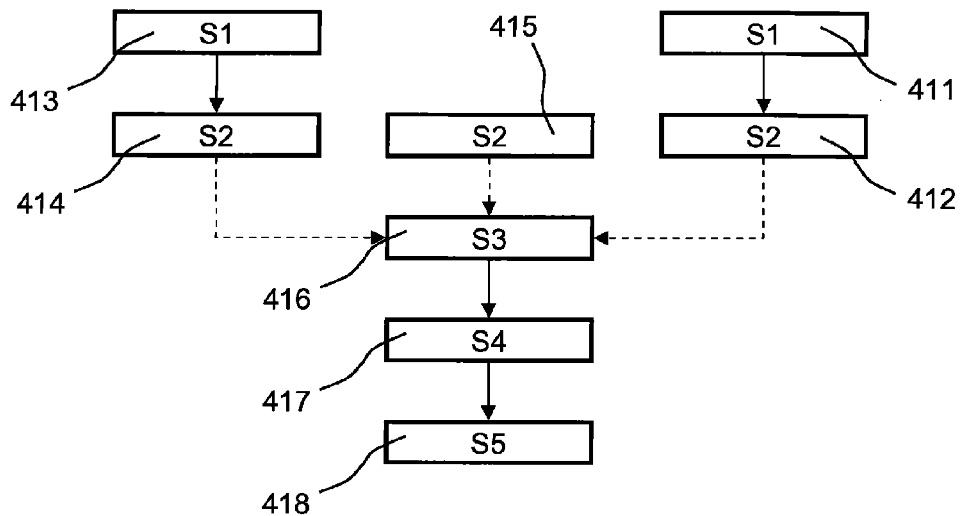
FIG. 13 is a flow chart of an opening process when operating a fluid delivery device.
Figure 14:
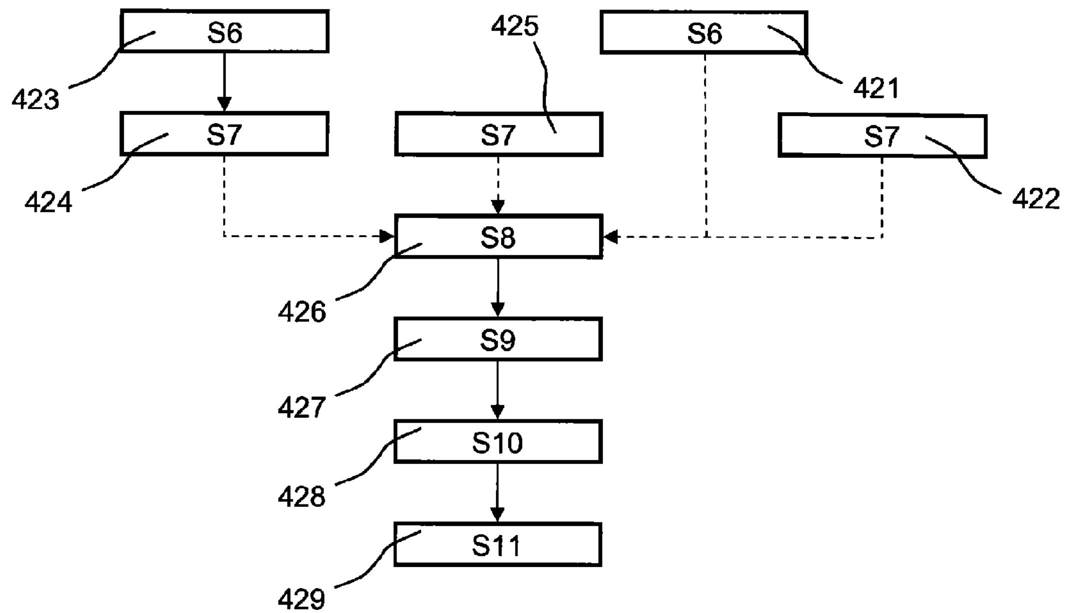
FIG. 14 is a flow chart of a closing process when operating a fluid delivery device.

Finally, FIGS. 13 and 14 provide an overview of how the method for controlling the opening state according to the present invention is carried out in detail.

Starting with the force application 415 to the tappet 330 in the opening direction O in step 2, the opening method 410 schematically shown in FIG. 13 proceeds in interdependent steps, or deterministically. The force application is mandatorily followed by step S3 (416) "moving the tappet 330 outward away from the outlet opening 320", step S4 (417) "moving the tappet head 331 into an open position outside the fluid supply chamber 310" and step S5 (418) "opening the outlet opening 320". The steps S2 to S5 are processes that take place in a causal sequence, however at least partially parallel in time.

For example, the method according to one embodiment of the present invention may vary with respect to the manner in which the force that acts onto the tappet 330 is generated in step S2. For example, said force may result from 412 "applying a force to the tappet 330 by means of the internal pressure of the fluid supply chamber 310 in the opening direction O", which in turn is achieved by step S1 (411) "pumping fluid into the fluid supply chamber 310 until the pressure is increased above a lower pressure threshold value". This way, control of the opening process 410 is affected by controlling the internal pressure of the fluid supply chamber 310. Since the opening process 410 is not affected instantly, this usually involves a constant pumping of fluid at least until the method step S5 (418) "opening the outlet opening 320" is reached. Force application in the opening direction O may also be effected in that, according to 413, a "control signal is transferred to the displacement device", whereupon in step 414 "a force is applied to the tappet 330 in the opening direction O by means of the displacement device 340". In said variant of the method, control of the opening process is affected by means of the control of the displacement device 340.

Both methods can readily also be combined, for example, part of the force 412 acting onto the tappet 330 in the opening direction O may be provided by the displacement device 340, while another part of said force 414 may be provided by means of the internal pressure of the fluid supply chamber 310.

As the above described opening method 410, the closing method 420 schematically illustrated in FIG. 14 is basically deterministic, however, varies in step S7 with respect to the source of the 426 force application to the tappet in the closing direction S. Step S7 is here mandatorily followed by step S8 (427) "moving the tappet 330 inward to the outlet opening 320", step S9 (427) "moving the tappet head 331 into a closed position", step S10 (428) "establishing contact between the tappet head 331 and the outlet wall 311 of the fluid supply chamber 310 at the sealing surfaces 323, 333" and step S11 (429) "sealing the outlet opening 320". The steps S7 to S11 are also processes which take place in causal sequence, which, however, are affected at least partially parallel in time.

Different variants are also possible for the realization of step 7 (426) "force application". For example, in step S7 (422) "force application to the tappet 330 in the closing direction S", the force application may be effected by means of a restoring spring, particularly a restoring pressure spring. Alternatively or additionally, in step S7 (424) "force application to the tappet 330 in the closing direction S", the force application may also be effected by means of the displacement device 340, the force application in this case being initiated by "transferring a control signal to the displacement device 340" according to step S6 (423).

While the present invention has been illustrated by description of various embodiments and while those embodiments have been described in considerable detail, it is not the intention of Applicant to restrict or in any way limit the scope of the appended claims to such details. Additional advantages and modifications will readily appear to those skilled in the art. The present invention in its broader aspects is therefore not limited to the specific details and illustrative examples shown and described. Accordingly, departures may be made from such details without departing from the spirit or scope of Applicant's invention.

What is claimed is:

1. A fluid delivery device for an injection device for introducing a fluid into a work chamber of a ground milling machine, comprising:

a fluid supply chamber including at least one outlet opening which is closable by a displaceable tappet, a displacement device configured to move the tappet between a closing position, in which the outlet opening is closed by the tappet, and an open position, in which the outlet opening is at least partially opened for delivering fluid outward out of the fluid supply chamber, wherein the tappet comprises a tappet shaft having an opening region and a tappet head closing the outlet opening, the opening region having a cross-sectional area that is smaller than a minimum cross-sectional area of the outlet opening, and the tappet head having a cross-sectional area that is greater than the minimum cross-sectional area of the outlet opening, and that the tappet, when being displaced in the opening direction from the closed position into the open position, is moved such that the tappet head is pushed outward at least partially away from the outlet opening, and that the tappet, when being displaced in the closing direction from the open position into the closed position, is moved such that it is retracted toward the outlet opening until the tappet head closes the outlet opening to the outside.

2. The fluid delivery device according to claim 1, wherein the outlet opening comprises an outer closure portion which is widened compared to the outlet opening in an outwardly widening, funnel-like manner.

3. The fluid delivery device according to claim 1, wherein the tappet head is at least partially configured as complementary to the closure portion of the outlet opening and that in the closed position the tappet head rests at least partially in a form fitting manner against the closure portion.

4. The fluid delivery device according to claim 3, wherein the outlet opening in the closure portion is configured in the shape of a hollow truncated cone and, in a complementary manner, the tappet head is configured in the shape of a truncated cone.

5. The fluid delivery device according to claim 3, wherein the tappet head is configured in the shape of a truncated pyramid, a truncated ellipsoid, a truncated sphere, a truncated paraboloid, or a truncated hyperboloid.

6. The fluid delivery device according to claim 1, wherein the tappet is spring-loaded in the closing direction (S).

7. The fluid delivery device according to claim 1, wherein the displacement device is driven hydraulically, pneumatically or electrically.

8. The fluid delivery device according to claim 1, wherein the displacement device comprises a piston-cylinder unit, the tappet being part of a piston of the piston-cylinder unit.

9. The fluid delivery device according to claim 1, wherein the displacement device comprises a stop element preventing the displacement of the tappet from the closed position in the opening direction (O) beyond a stop position.

10. The fluid delivery device according to claim 9, wherein the stop position of the tappet is the position in which the outlet opening is maximally opened.

11. The fluid delivery device according to claim 1, wherein a tappet protection device having a guide surface for deflecting milled-off material is arranged on the outer side of the fluid delivery device next to the outlet opening, the guide surface being arranged such that it deflects milled material moved transversely to the closing direction at least partially in a direction that leads away from the tappet.

12. An injection device, comprising:

at least two fluid delivery devices according to claim 1, a line system for supplying fluid to the at least two fluid delivery devices, and a control unit which is configured for the control of the displacement devices of the at least two fluid delivery devices.

13. A ground milling machine having an injection device according to claim 12.

14. A ground milling machine according to claim 13, wherein the ground milling machine comprises a recycler, a stabilizer or cold milling machine.

15. A method for controlling the opening state of a fluid delivery device according to claim 1, comprising:

a) moving the tappet from a closed position (P1) into an open position (P2) by the steps of:

applying a force to the tappet in an opening direction (O);

moving the tappet outward and away from the outlet opening;

moving the tappet head into an open position outside a fluid supply chamber; and opening the outlet opening;

b) closing the tappet from the open position (P2) into a closed position by the steps of:

applying a force to the tappet in the closing direction (S);

moving the tappet inward and toward the outlet opening; thus moving the tappet head into a closed position;

establishing contact between the tappet head and an outer wall of the fluid supply chamber via sealing surfaces; and sealing the outlet opening.

16. The method according to claim 15, the opening comprising the steps of:

pumping fluid into the fluid supply chamber until the pressure exceeds a lower pressure threshold value; and applying a force to the tappet in the opening direction (O) via the internal pressure of the fluid supply chamber;

the closing comprising the steps of:

reducing the pressure in the fluid supply chamber (310) below a lower pressure threshold value; and applying a force to the tappet in the closing direction (S) via a restoring spring.

17. The method according to claim 15, the opening comprising the steps of:

transferring a control signal to the displacement device (340); and applying a force to the tappet in the opening direction (O) via the displacement device;

the closing comprising the steps of:

transferring a control signal to the displacement device; and applying a force to the tappet in the closing direction (S) via the displacement device.

* * * * *